US009896267B2

(12) United States Patent
Nakamura et al.

(10) Patent No.: US 9,896,267 B2
(45) Date of Patent: Feb. 20, 2018

(54) CARGO HANDLING APPARATUS AND METHOD

(71) Applicant: KABUSHIKI KAISHA TOSHIBA, Tokyo (JP)

(72) Inventors: Hiroaki Nakamura, Kanagawa (JP); Kiminori Toya, Kanagawa (JP); Hideichi Nakamoto, Tokyo (JP); Haruna Eto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/667,039

(22) Filed: Aug. 2, 2017

(65) Prior Publication Data

US 2017/0355523 A1 Dec. 14, 2017

Related U.S. Application Data

(63) Continuation of application No. 14/725,395, filed on May 29, 2015, now Pat. No. 9,758,300.

(30) Foreign Application Priority Data

May 29, 2014 (JP) .................. 2014-111729

(51) Int. Cl.
*G06F 7/00* (2006.01)
*B65G 1/04* (2006.01)
*B65G 47/91* (2006.01)

(52) U.S. Cl.
CPC ......... *B65G 1/0435* (2013.01); *B65G 47/912* (2013.01)

(58) Field of Classification Search
USPC ........................................ 700/230
See application file for complete search history.

(56) References Cited

U.S. PATENT DOCUMENTS 5,232,332 A 8/1993 Focke
5,263,813 A * 11/1993 Kiederle ............... B65G 47/90
294/67.31

(Continued)

FOREIGN PATENT DOCUMENTS

CN 101583242 A 11/2009
CN 203306725 U 11/2013
(Continued)

*Primary Examiner* — Kyle Logan
(74) *Attorney, Agent, or Firm* — Finnegan, Henderson, Farabow, Garrett & Dunner, L.L.P.

(57) ABSTRACT

According to one embodiment, a cargo handling apparatus includes a first mechanism, a second mechanism, a holding unit, a third mechanism, a fourth mechanism and a conveyor. The first mechanism is movable in a first direction. The second mechanism is connected to the first mechanism and is movable on a first horizontal plane intersecting the first direction. The holding unit is connected to the second mechanism and holds an object to be picked up. The third mechanism is arranged below the first mechanism, the second mechanism and the holding unit, and is movable in the first direction. The fourth mechanism is connected to the third mechanism and is movable on a second horizontal plane opposed to the first horizontal plane. The conveyor is connected to the fourth mechanism, and loads and conveys the object held by the holding unit.

7 Claims, 14 Drawing Sheets

(56) References Cited

U.S. PATENT DOCUMENTS

| | | | | |
|---|---|---|---|---|
| 5,683,222 A * | 11/1997 | Ingelhag | ............... | B65G 59/023 |
| | | | | 414/797.2 |
| 6,923,612 B2 | 8/2005 | Hansl | | |
| 2001/0052708 A1 * | 12/2001 | Schmalz | ................ | B65G 47/91 |
| | | | | 294/65 |
| 2012/0253507 A1 * | 10/2012 | Eldershaw | ............. | B65G 47/00 |
| | | | | 700/218 |

FOREIGN PATENT DOCUMENTS

| | | |
|---|---|---|
| EP | 0 432 565 A1 | 6/1991 |
| JP | 5-201546 | 8/1993 |
| JP | 6-345252 | 12/1994 |
| JP | 7-133006 | 5/1995 |
| JP | 7-309407 | 11/1995 |
| JP | 11-20948 | 1/1999 |
| JP | 2002-154656 | 5/2002 |
| JP | 2007-204174 | 8/2007 |
| JP | 2013-103836 | 5/2013 |

* cited by examiner

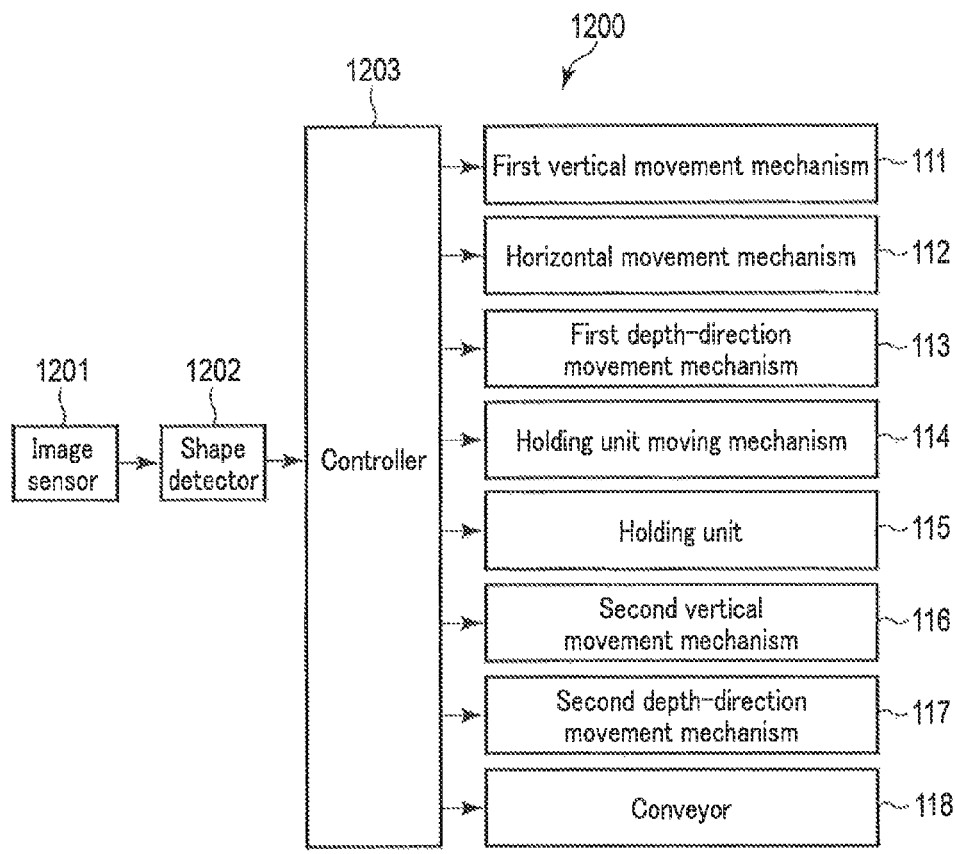
F I G. 12
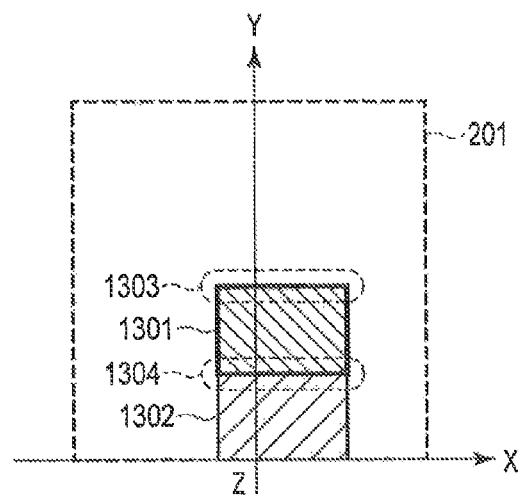
F I G. 13

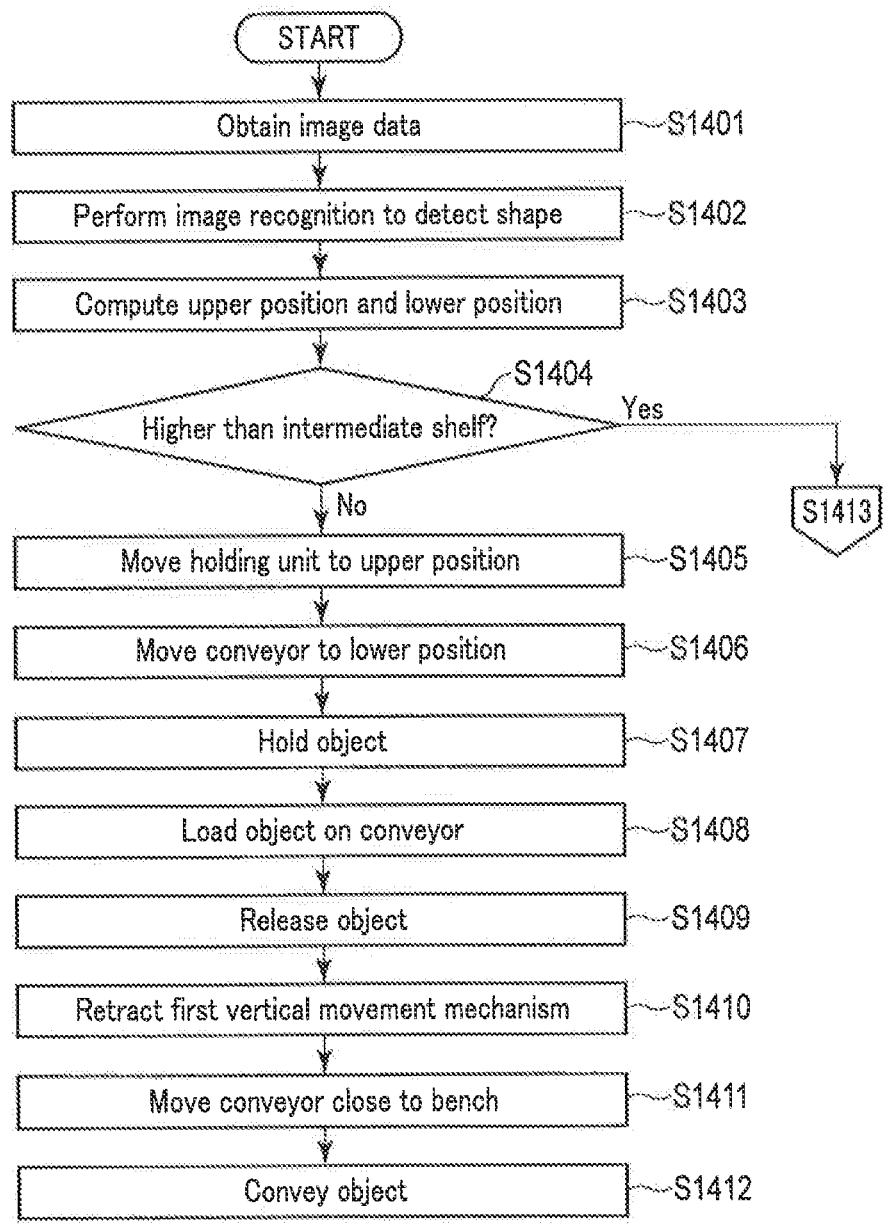
F I G. 14A

CARGO HANDLING APPARATUS AND METHOD

CROSS-REFERENCE TO RELATED APPLICATIONS

This is a continuation of application Ser. No. 14/725,395, filed May 29, 2015, which claims the benefit of priority from Japanese Patent Application No. 2014-111729, filed May 29, 2014, the entire contents of which are incorporated herein by reference.

FIELD

Embodiments described herein relate generally to a cargo handling apparatus and method.

BACKGROUND

Due to the globalization of supply chains and the aging of the working population, there has been a trend of shortages in the labor force for handling the increased volume of physical distribution. Therefore, Cartesian robots and articulated-arm robots have been popularized to achieve high-speed and effective cargo handling operations, such as picking of goods.

BRIEF DESCRIPTION OF THE DRAWINGS

FIG. 12 is a block diagram of a cargo handling apparatus according to the second embodiment.

FIG. 13 illustrates an example of location information generation processing in a shape detector 1202.

FIG. 14A is a flowchart showing an operation of a cargo handling apparatus according to the second embodiment.

DETAILED DESCRIPTION

There is a tendency toward the aforementioned cartesian coordinate robots and articulated-arm robots becoming larger. For example, cartesian coordinate robots that hold a product from the top need vertically long arms. Such robots cannot be used in a vertically limited space, such as a place with a low ceiling. To avoid known obstacles, it is necessary to provide a redundant number of articulations to articulated-arm robots that hold a product from the top.

In addition, when products are loaded in a cubic space which has an intermediate shelf, an additional number of redundant articulations need to be applied to pick up a product from the intermediate shelf, leading to a problem of increasing the size of robots.

In general, according to one embodiment, a cargo handling apparatus includes a first movement mechanism, a second movement mechanism, a holding unit, a third movement mechanism, a fourth movement mechanism and a conveyor. The first movement mechanism is movable in a first direction. The second movement mechanism is connected to the first movement mechanism and is movable on a first horizontal plane intersecting the first direction. The holding unit is connected to the second movement mechanism and holds an object to be picked up. The third movement mechanism is arranged below the first movement mechanism, the second movement mechanism and the holding unit, and is movable in the first direction. The fourth movement mechanism is connected to the third movement mechanism and is movable on a second horizontal plane opposed to the first horizontal plane. The conveyor is connected to the fourth movement mechanism, and loads and conveys the object held by the holding unit.

In the following, the cargo handling apparatus and method according to the present embodiment will be described in detail with reference to the drawings. In the embodiment described below, elements specified by the same reference numbers carry out the same operations, and a duplicate description of such elements will be omitted.

(First Embodiment)

Figure 1:
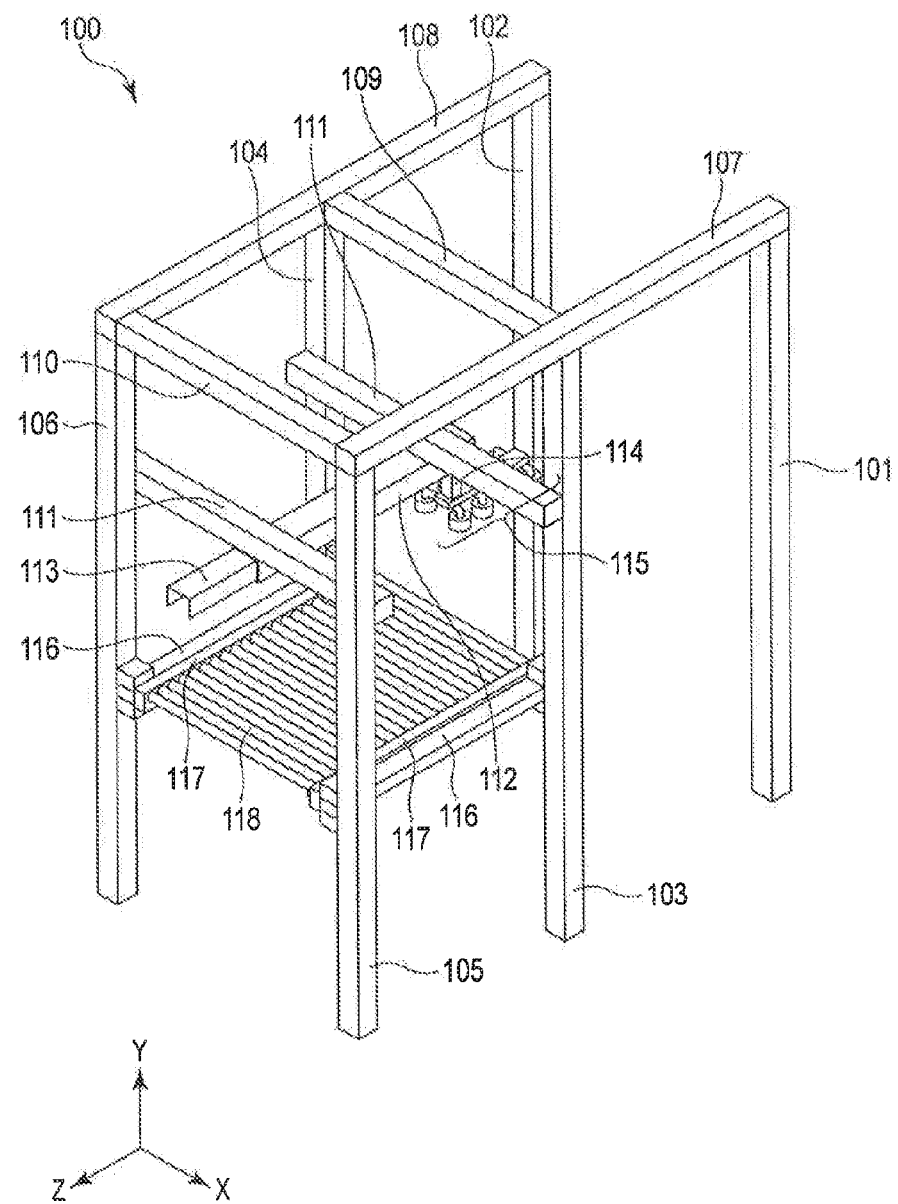
FIG. 1 illustrates a cargo handling apparatus according to the first embodiment.

The cargo handling apparatus according to the first embodiment will be explained with reference to FIG. 1.

A cargo handling apparatus 100 according to the first embodiment includes a first vertical member 101, a second vertical member 102, a third vertical member 103, a fourth vertical member 104, a fifth vertical member 105, a sixth vertical member 106, a first horizontal member 107, a second horizontal member 108, a third horizontal member 109, a fourth horizontal member 110, a first vertical movement mechanism 111, a horizontal movement mechanism 112, a first depth-direction movement mechanism 113, a holding unit moving mechanism 114, a holding unit 115, a second vertical movement mechanism 116, a second depth-direction movement mechanism 117, and a conveyor 118.

The first vertical movement mechanism 111 is also referred to as a first movement mechanism, and a combination of the horizontal movement mechanism 112 and the first depth-direction movement mechanism 113 is referred to as a second movement mechanism. The second vertical movement mechanism 116 is also referred to as a third movement mechanism, and the second depth-direction movement mechanism 117 is also referred to as a forth movement mechanism.

The first vertical member 101, the second vertical member 102, the third vertical member 103, the fourth vertical member 104, the fifth vertical member 105, the sixth vertical member 106, the first horizontal member 107, the second horizontal member 108, the third horizontal member 109, and the fourth horizontal member 110 are supporting members which form a framework of the cargo handling apparatus 100, and together they are also referred to as a base.

The base according to the present embodiment is formed in the following manner. The first vertical member 101, the third vertical member 103, and the fifth vertical member 105 stand in such a manner that one end of each member is grounded, and another end of each member is coupled to the first horizontal member 107. The second vertical member 102, the fourth vertical member 104, and the sixth vertical member 106 stand in such a manner that one end of each member is grounded, and another end of each member is coupled to the second horizontal member 108. The third horizontal member 109 is horizontally coupled to the first horizontal member 107 and the second horizontal member 108 in such a manner that one end is coupled in the vicinity of a position where the third vertical member 103 is coupled, and another end is coupled in the vicinity of a position where the fourth vertical member 104 is coupled. The fourth horizontal member 110 is horizontally coupled to the first horizontal member 107 and the second horizontal member 108 in such a manner that one end is coupled in the vicinity of a position where the fifth vertical member 105 is coupled, and another end is coupled in the vicinity of a position where the sixth vertical member 106 is coupled.

The base is not limited to the aforementioned shape, but may be formed so as to support the first vertical movement mechanism 111, the horizontal movement mechanism 112, the first depth-direction movement mechanism 113, the holding unit moving mechanism 114, the holding unit 115, the second vertical movement mechanism 116, the second depth-direction movement mechanism 117, and the conveyor 118.

The first vertical movement mechanism 111 is connected to the third vertical member 103, fourth vertical member 104, fifth vertical member 105, and sixth vertical member 106 of the base so as to be movable in the vertical direction (Y axis direction). For example, guide rails are attached along the third vertical member 103, fourth vertical member 104, fifth vertical member 105, and sixth vertical member 106 of the base in the vertical direction so that the first vertical movement mechanism 111 vertically moves along the guide rails.

The horizontal movement mechanism 112 is connected to the first vertical movement mechanism 111 so as to be movable in the horizontal direction (X axis direction). For example, a guide rail is attached along the first vertical movement mechanism 111 in the horizontal direction so that the horizontal movement mechanism 112 horizontally moves along the guide rail.

The first depth-direction movement mechanism 113 is connected to the horizontal movement mechanism 112 so as to be movable in the depth direction (Z axis direction). For example, a guide rail is attached along the horizontal movement mechanism 112 in the depth direction so that the first depth-direction movement mechanism 113 moves along the guide rail in the depth direction.

The holding unit moving mechanism 114 is connected to the first depth-direction movement mechanism 113 so as to be movable in the depth direction. For example, a guide rail is attached along the bottom of the first depth-direction movement mechanism 113 in the depth direction so that the holding unit 115 moves along the depth-direction movement mechanism 113 in the depth direction. In this embodiment, the holding unit 115 is movable between both ends of the first depth-direction movement mechanism 113, and accordingly, the moving range of the holding unit 115 is greater than that of the first depth-direction movement mechanism 113 within the base.

The holding unit 115 is connected to the first depth-direction movement mechanism 113, and holds a product to be picked up (hereinafter referred to as an object). The holding unit 115 may be set as rotatable so as to deal with various kinds of objects. The holding unit 115 includes a suction power source such as a compressor, and a controllable open valve that can be opened and closed, such as an electromagnetic valve. The holding unit 115 uses at least one suction pad to hold an object by suction and to release the object by stopping the suction through the open valve. A plurality of holding units 115 may be used to obtain a desired carrying force. It is desirable to use a pad formed of an elastic material having a bellows shape, or supported by a spring to adjust the distance between the object and the holding unit 115 when they are in contact with each other. The holding unit 115 may be formed in such a manner as to hold an object from both sides, instead of applying a suction pad. The configuration of the holding unit 115 may vary if the function of moving an object is achieved.

The second vertical movement mechanism 116 is placed below the first vertical movement mechanism 111 and is connected to the third vertical member 103, fourth vertical member 104, fifth vertical member 105, and sixth vertical member 106 of the base so as to be movable in the vertical direction. The second vertical movement mechanism 116 vertically moves along the guide rails of the base in a similar manner to the first vertical movement mechanism 111.

The second depth-direction movement mechanism 117 is connected to the second vertical movement mechanism 116 so as to be movable in the depth direction. For example, a guide rail is attached along the second vertical movement mechanism 116 in the depth direction so that the second depth-direction movement mechanism 117 moves along the second vertical movement mechanism 116 in the depth direction.

The conveyor 118 is a conveyor such as a belt conveyor or a roller conveyor which is connected to the second depth-direction movement mechanism 117. The conveyor 118 carries an object loaded thereon by rotating rollers with a rotation force applied to a motor.

The pick-up process of the cargo handling apparatus 100 according to the first embodiment will be explained with reference to FIGS. 2 to 7.

It is assumed that boxes loaded in a loading box 201 are picked up as objects 202 and 203, and the objects 202 and 203 are moved to a bench 205. FIGS. 2 to 7 illustrate a case where the object 202 is picked up.

The loading box 201 is a shelf with a lattice/grid type of enclosure and has wheels at the bottom. The loading box 201 can move with the products being loaded. In this embodiment, the loading box 201 can be secured within the base. The loading box 201 is secured by the base when a pick-up operation is performed. The loading box 201 is not limited to being secured within the base, but may be secured adjacent to the cargo handling apparatus 100.

The bench 205 is a destination of an object carried from the loading box 201, and may be a static bench to temporarily keep the object, or may be a movable bench to carry the object to another location by means of a belt conveyor. In this embodiment, it is assumed that a movable bench is used, and an object carried to the bench 205 from the loading box 201 is sequentially carried to another location.

In addition, it is assumed that the position of objects to be loaded within the loading box 201 and the order of picking up the objects are predetermined, and a controller (not shown in the drawings) controls the holding unit 115 to hold the object and controls each movement mechanism of the cargo handling apparatus 100 to move by a predetermined distance to the position where the objects can be loaded to the conveyor 118. Methods to control the movement mechanism include an open-loop control method which allows each movement mechanism to move by rotating a step motor a predetermined amount based on a designated pulse, or a close-loop control method which allows each movement mechanism to move to a designated location by minimizing an error between a target value and a value measured by a location sensor.

Figure 2:
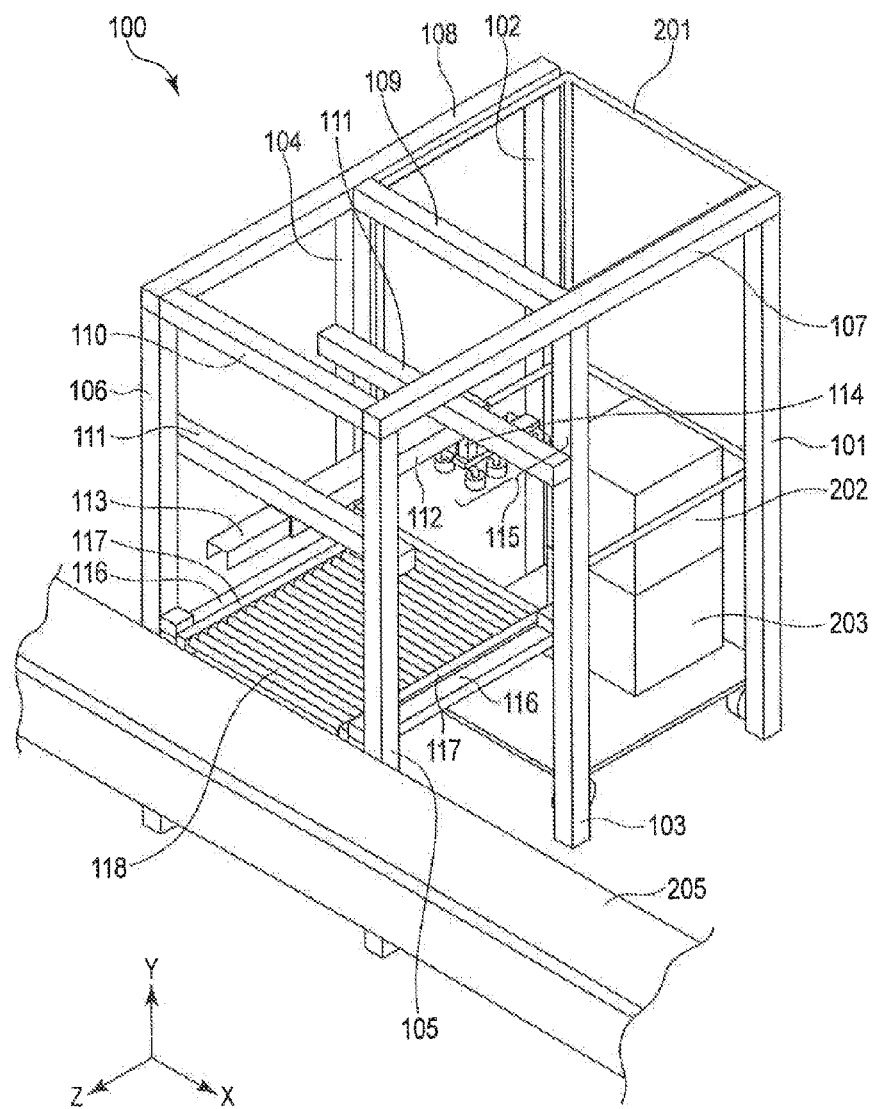
FIG. 2 illustrates an initial state in cargo handling processing.

FIG. 2 illustrates an initial state before proceeding with the cargo handling processing. The loading box 201 is placed in the cargo handling apparatus 100. The cargo handling apparatus 100 is arranged close to the bench 205, which is a destination of an object from the conveyor 118, so that the object is carried from the conveyor 118 to the bench 205.

Figure 3:
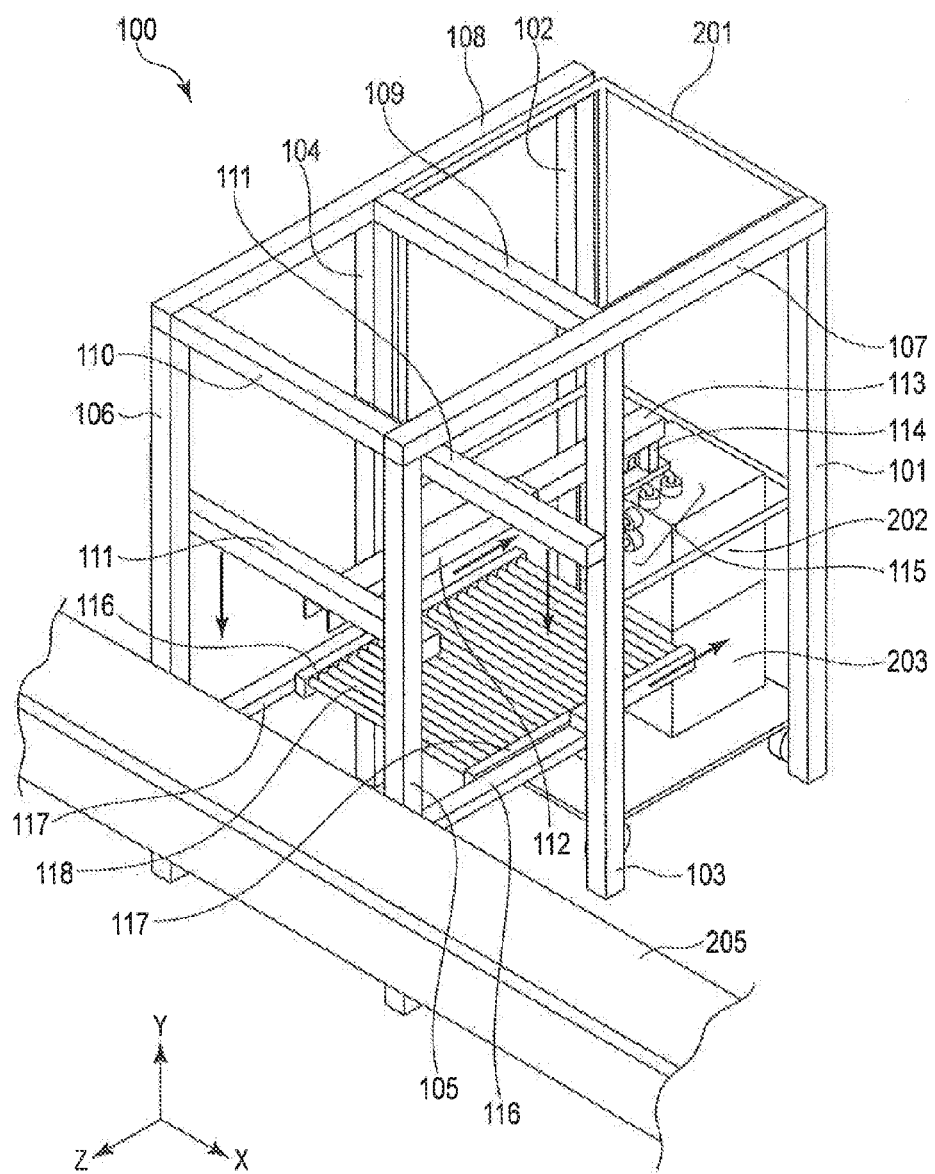
FIG. 3 illustrates a state of holding an object in cargo handling processing.

FIG. 3 illustrates a state where the cargo handling apparatus 100 holds the object 202. The first vertical movement mechanism 111 moves down (the negative direction of the Y axis) to the position which allows the holding unit 115 to hold the object 202. It is assumed that the second vertical movement mechanism 116 is initially placed at a height where the object 202 can be loaded on the conveyor 118. If the conveyor 118 is placed at a position where the object 202 cannot be loaded, the second vertical movement mechanism 116 vertically moves to the position flush with the bottom of the object 202 so that the object 202 can be loaded on the conveyor 118.

The first vertical movement mechanism 113 moves in the depth direction (the negative direction of the Z axis) to the position allowing the holding unit 115 to hold the object 202 by applying suction to the object 202. The holding unit 115 holds the object 202 by suction at the front surface and the top surface. The horizontal movement mechanism 112 may move in the horizontal direction (the X axis direction) in accordance with the position of the object 202. Similar to the first depth-direction movement mechanism 113, the second depth-direction movement mechanism 117 moves in the depth direction (the negative direction of the Z axis) to the front surface of the object 202. The edge of the conveyor 118 may be placed near the bottom of the front surface of the object 202. It is acceptable that the edge is placed slightly higher than the bottom, but it is desirable that the edge is placed below he bottom of the object 202. Accordingly, the object 202 is securely loaded on the conveyor 118.

Figure 4:
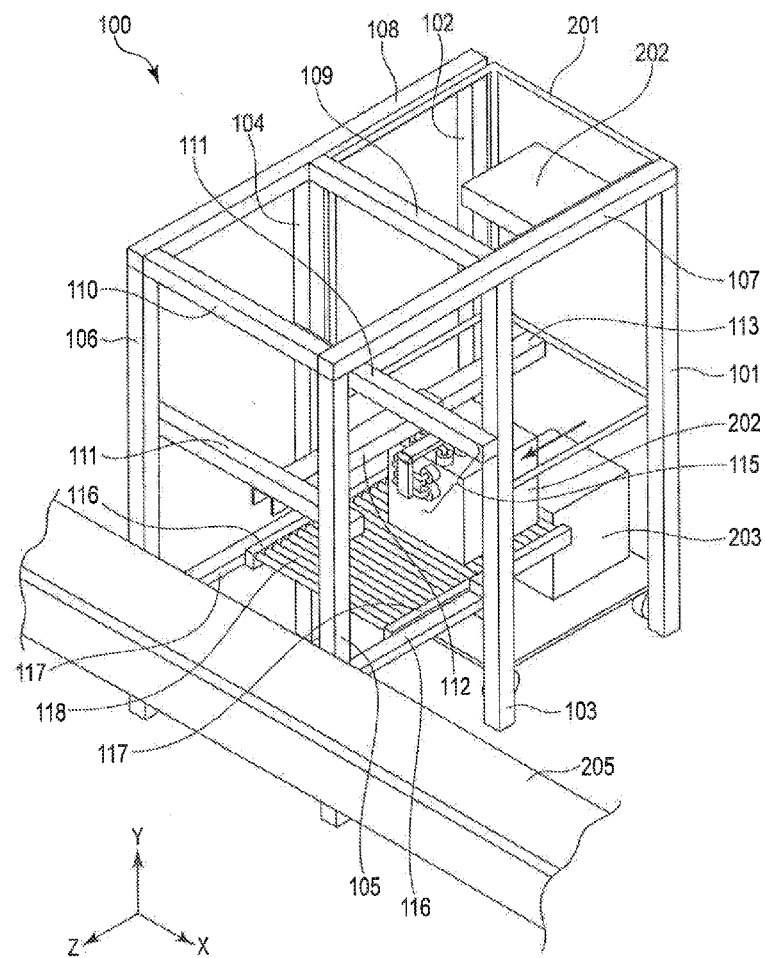
FIG. 4 illustrates a state of loading the object in cargo handling processing.

FIG. 4 illustrates a state where the object 202 is loaded on the conveyor 118. The second depth-direction movement mechanism 117 moves in the positive direction of the z axis while the holding unit 115 holds the object 202. The conveyor 118, which is a belt conveyor, moves in the Z axis direction so that a carrier force is applied to the top and bottom surfaces of the object 202 by sandwiching the object 202 between the holding unit 115 and the conveyor 118. This allows the object 202 to be easily loaded onto the conveyor 118. t is desirable that the moving speed of the second depth-direction movement mechanism 117 is equal to the moving speed of the conveyor 118 to prevent the object 202 from falling.

When the object 202 reaches a predetermined position of the conveyor 118, the movement of the second depth-direction movement mechanism 117 and the conveyor 118 is stopped. By the above process, loading of the object 202 to the conveyor 118 is completed. If the object 202 is light-weight, the motor is not energized so as to allow the conveyor 118 to be idled. In this state, the object 202 moves on the conveyor 118 while being held by the holding unit 115 to the predetermined position.

Figure 5:
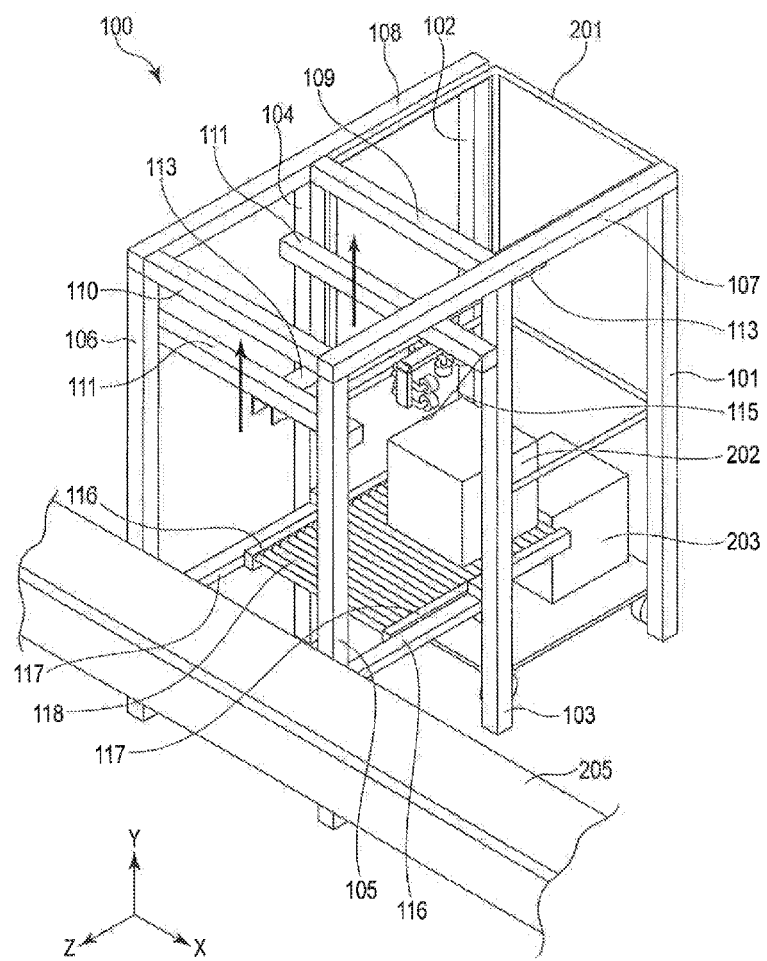
FIG. 5 illustrates a state of retracting a moving mechanism in cargo handling processing.

FIG. 5 illustrates a state where the holding unit 115 is retracted so as to not obstruct the movement of the object 202.

The holding unit 115 releases the object 202 by stopping suction, and the first vertical movement mechanism 111 moves upward to separate from the object 202. The amount of movement of the first vertical movement mechanism 111 may be determined so that the first vertical movement mechanism 111, the horizontal movement mechanism 112, the first depth-direction movement mechanism 113, the holding unit moving mechanism 114, and the holding unit 115 do not collide with each other when the conveyor carries the object.

Figure 6:
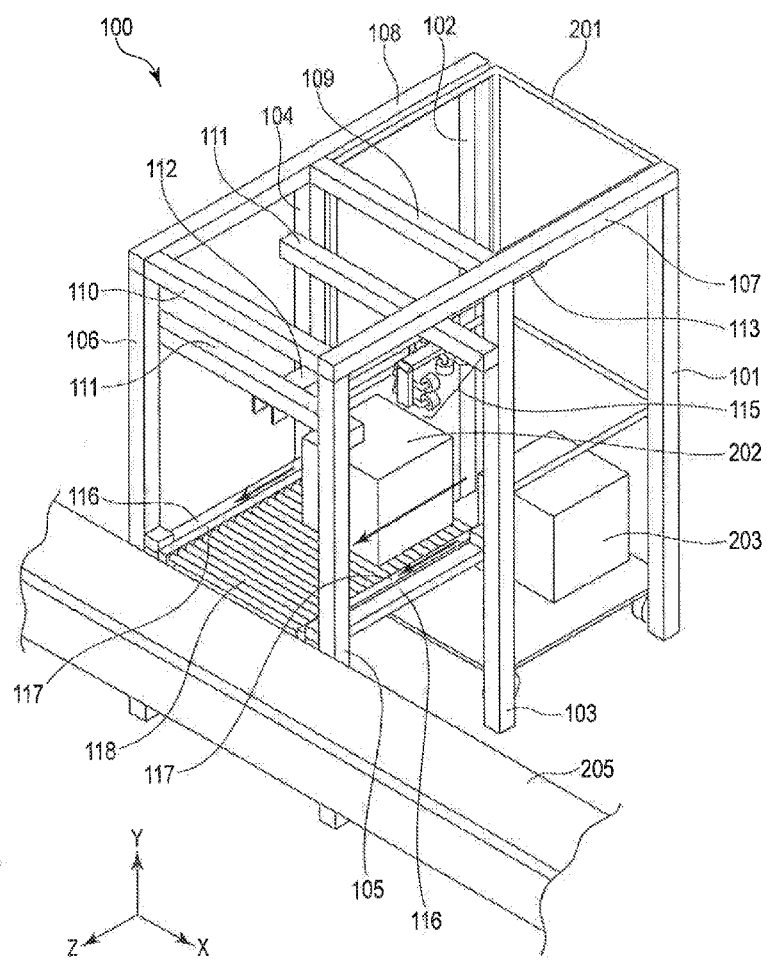
FIG. 6 illustrates a state where a conveyor is placed at a position alongside a bench in cargo handling processing.

FIG. 6 illustrates a state where the conveyor 118 is placed alongside the bench 205.

The second depth-direction movement mechanism 117 moves toward the bench 205, the second vertical movement mechanism 116 vertically moves to a position where the edge of the conveyor 118 facing the bench 205 is adjacent to the bench 205, and the object 202 is carried without incurring shock to the bench 205. Specifically, the second vertical movement mechanism 116 moves to the position where the edge of the conveyor 118 is slightly higher than the edge of the bench 205. When the second depth-direction movement mechanism 117 is moving, the conveyor 118 may be stopped so that the object 202 is stationary, or may be moving at a speed so that the object 202 does not fall.

Figure 7:
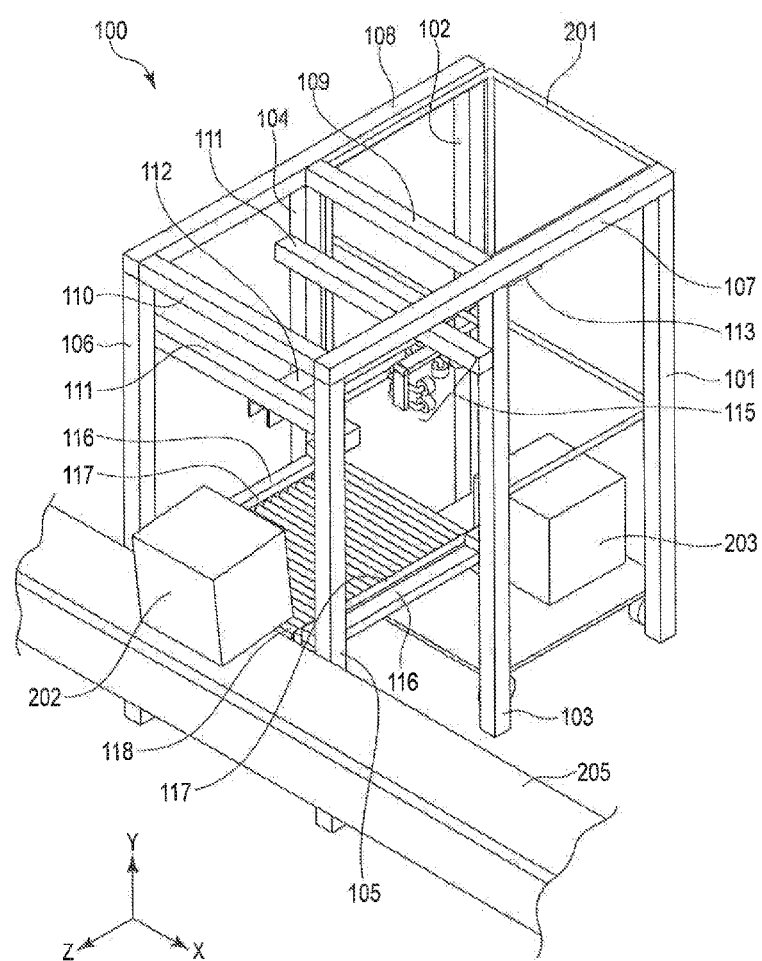
FIG. 7 illustrates a state of loading the object in cargo handling processing.

FIG. 7 illustrates a state where the object 202 is being carried onto the bench 205 from the conveyor 118. The conveyor 118 moves so that the object is carried onto the bench 205 by rotating the conveyor. The speed of conveyor 118 is controlled, taking the moving speed of bench 205 into consideration so that the object 202 does not fall when entering the bench 205. The cargo handling processing of the cargo handling apparatus 100 is completed by the above operation.

Another example of the pick-up process of the cargo handling apparatus 100 according to the first embodiment will be explained with reference to FIGS. 8 to 11.

Figure 8:
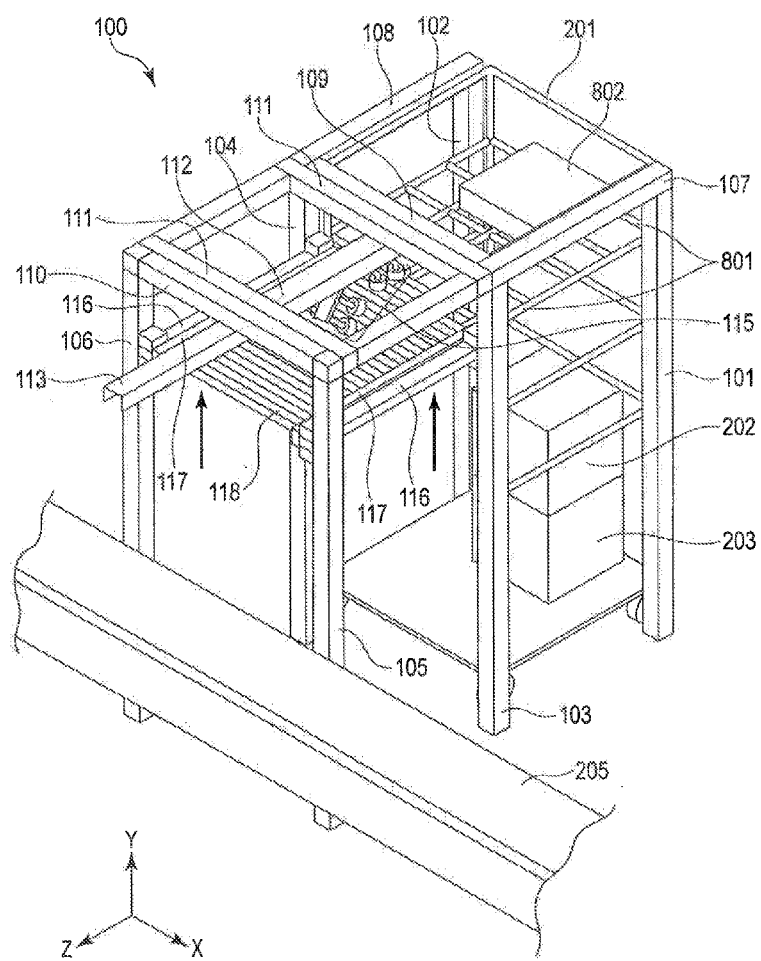
FIG. 8 illustrates an initial state when an object is loaded on an intermediate shelf.

It is assumed that the loading box 201 loads a great number of objects. When a great number of objects are loaded, a load is applied to objects placed at lower positions. Due to the applied load, objects may be deformed or damaged. To avoid this, there may be a case where an intermediate shelf is provided to the loading box to disperse objects, and objects are loaded on the intermediate shelf. FIGS. 8 to 11 show the case where an intermediate shelf 801 is provided to the loading box 201, and an object 802 is picked up from the intermediate shelf. FIG. 8 illustrates an initial state when an object is to be picked up from the intermediate shelf 801. The first vertical movement mechanism 111 moves up (the positive direction of the Y axis) to the position allowing the holding unit 115 to hold the object 802 placed on the intermediate shelf 801. When the first vertical movement mechanism 111 moves up, the first depth-direction movement mechanism 113 and the holding unit 115 moves to the outside of the loading box 201 so as to not strike the intermediate shelf. Specifically, the first depth-direction movement mechanism 113 and the holding unit 115 move in the positive direction of the Z axis. Then, the first vertical movement mechanism 111 moves up.

Similarly, the second depth-direction movement mechanism 117 and the conveyor 118 move in the positive direction of the Z axis so as to not strike the intermediate shelf 801, and then the second vertical movement mechanism 116 moves to the position close to the upper surface of the intermediate shelf 801. Specifically, the second vertical movement mechanism 116 moves to the position where the edge of the intermediate shelf 801 is flush with the edge of the conveyor 118, or the edge of the conveyor 118 is lower than the edge of the intermediate shelf 801.

Figure 9:
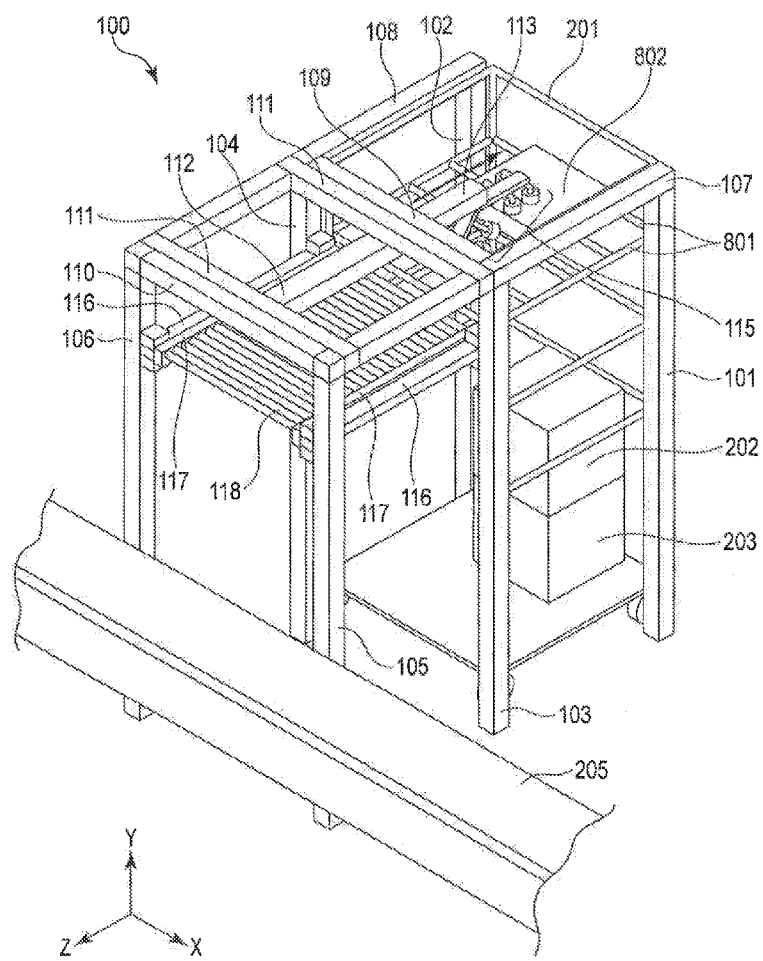
FIG. 9 illustrates a state of holding the object when the object is loaded on the intermediate shelf.

FIG. 9 illustrates a state where the object 802 is picked up from the intermediate shelf 801. The first depth-direction movement mechanism 113 moves toward the object 802 placed on the intermediate shelf 801. Then, the holding unit 115 suctions and holds the object 802.

Figure 10:
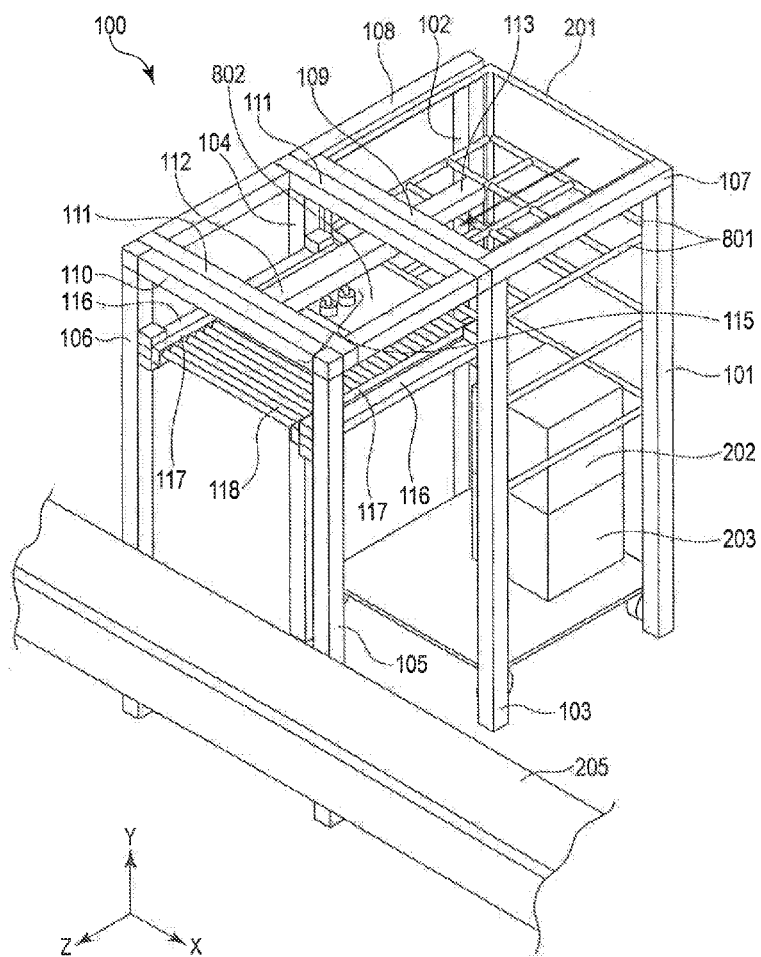
FIG. 10 illustrates a state of loading the object when the object is loaded on the intermediate shelf.

FIG. 10 illustrates a state where the object 802 is loaded onto the conveyor 118. The holding unit 115 moves in the positive direction of the Z axis while holding the object 802. The operation of the holding unit 115 and the conveyor 118 is similar to that explained with reference to FIG. 4.

Figure 11:
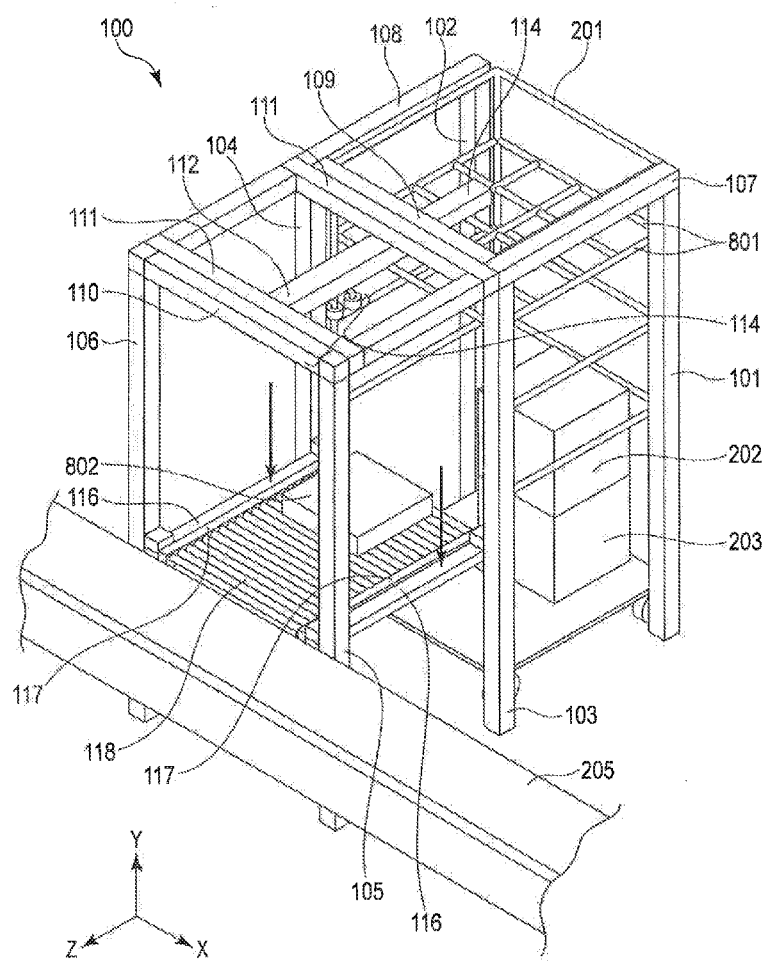
FIG. 11 illustrates a state where a conveyor is placed at a position alongside a bench when the object is loaded on the intermediate shelf.

FIG. 11 illustrates a state where the conveyor 118 is placed alongside the bench 205. The second vertical movement mechanism 116 moves down so that the edge of the bench 205 is flush with the edge of the conveyor 118. Since the holding unit 115 does not interfere when the object 802 is moved to the bench 205, the holding unit 115 does not have to be retracted. The operation of carrying the object 802 from the conveyor 118 to the bench 205 is similar to that shown in FIG. 7, and the explanation thereof will be omitted. The operation of picking up the object 802 loaded on the intermediate shelf 801 is completed by the above.

According to the first embodiment, an object is picked up from the loading box by the holding unit and by the conveyor that move in the vertical or depth direction within the base. This implements a cargo handling apparatus having substantially the same size as the range of motion of the holding unit and the conveyor, and accomplishes downsizing of the apparatus. In addition, the holding unit and the conveyor, by being able to move independently in the vertical or depth direction, enables the application of the apparatus to the existing carrying belt conveyor and the existing loading box having an intermediate shelf. Furthermore, the holding unit and the conveyor operate cooperatively.

Specifically, when picking up the object, the conveyor moves close to the holding unit to shorten the time that the holding unit itself supports the object, and the conveyor moves to the height of the bench which is the destination of the object to smoothly move the object to the bench. Accordingly, the apparatus according to the first embodiment picks up or carries an object stably even for dealing with heavy objects or objects at a higher location.

(Second Embodiment)

In the first embodiment, the location of objects to be loaded within a loading box or the like, the number of objects, and the order of picking up the objects are predetermined, and the objects can be picked up by controlling a predetermined driving power and the order. The second embodiment is different from the first embodiment in that an image sensor detects the position of objects to be loaded. The function of detecting the position of objects achieves the application of the cargo handling apparatus for any arrangement of objects, and increases versatility.

The cargo handling apparatus according to the second embodiment will be explained with reference to the block diagram of FIG. 12.

A cargo handling apparatus 1200 according to the second embodiment includes the first vertical movement mechanism 111, the horizontal movement mechanism 112, the first depth-direction movement mechanism 113, the holding unit moving mechanism 114, the holding unit 115, the second vertical movement mechanism 116, the second depth-direction movement mechanism 117, the conveyor 118, an image sensor 1201, a shape detector 1202, and a controller 1203.

The image sensor 1201 is a stereo camera sensor or a distant image sensor such as a laser range finder which can obtain three-dimensional positional information, and the image sensor 1201 captures an image or a movie of an object and generates image data.

The shape detector 1202 receives the image data from the image sensor 1201, and detects an upper position and a lower position of the object based on the image data. The shape detector 1202 generates positional information, including the upper position and the lower position of the object, the distance to the upper position from a predetermined point, and the distance to the lower position from the predetermined point in the depth direction.

The controller 1203 receives the positional information from the shape detector 1202, drives the first vertical movement mechanism 111, the horizontal movement mechanism 112, and the first depth-direction movement mechanism 113 so that the holding unit 115 moves toward the upper position, and drives the second vertical movement mechanism 116 and the second depth-direction movement mechanism 117 so that the conveyor 118 moves toward the lower position, based on the positional information.

To control the driving operation, the controller 1203 generates a driving signal indicating the driving amount for each of the first vertical movement mechanism 111, the horizontal movement mechanism 112, the first depth-direction movement mechanism 113, the holding unit moving mechanism 114, the second vertical movement mechanism 116, and the second depth-direction movement mechanism 117. In addition, the controller 1203 generates a holding control signal to control the holding operation of the holding unit 115, and a convey control signal to control the carrying operation of the conveyor 118, The first vertical movement mechanism 111, the horizontal movement mechanism 112, the first depth-direction movement mechanism 113, the holding unit moving mechanism 114, the second vertical movement mechanism 116, and the second depth-direction movement mechanism 117 each receive a driving signal from the controller 1203 to be driven with the driving amount indicated by the driving signal.

The holding unit 115 receives a holding control signal from, the controller 1203 to start or stop the holding operation based on the holding control signal.

The conveyor 116 receives a convey control signal from the controller 1203 to start or stop rotation of the conveyor, or to adjust the speed of rotation based on the convey control signal.

The shape of the cargo handling apparatus 1200 according to the second embodiment is similar to the cargo handling apparatus 100 according to the first embodiment, and the explanation thereof will be omitted. The image sensor 1201 may be fixed at a position where an image of an object in the loading box can be captured. The shape detector 1202 and the controller 1203 may be arranged as a control board on the base, or arranged remotely from the cargo handling apparatus 1200. When remotely arranged, image data is received via a wire or wirelessly from the cargo handling apparatus 1200, and a holding control signal and a convey control signal are sent back to the cargo handling apparatus 1200.

An example of positional information generation in the shape detector 1202 will be explained with reference to FIG. 13.

FIG. 13 illustrates image data acquired from the image sensor. The image is captured from the opened side of the loading box 201 in which two boxes are loaded. A relationship of each of coordinate axes is the same as those shown in FIG. 2. In FIG. 13, the bottom of the loading box 201 is set as the base line.

The shape detector 1202 performs image recognition of the image data, and extracts three-dimensional positional information or RGB image information to recognize the shape of an object. In the example shown in FIG. 13, two rectangles 1301 and 1302 are recognized, and a rectangle having the maximum value in the vertical direction (Y axis direction) and the minimum value in the depth direction (Z axis direction) is set as an object.

That is, a box placed closest to the holding unit and at the top is picked up first. In this example, the rectangle 1301 is set as an object. The shape detector 1202 obtains an upper position 1303 of the object, and computes coordinates of the upper position 1303 and the distance from the predetermined point to the upper position 1303. The shape detector 1202 also obtains a lower position 1304 of the object, and computes coordinates of the lower position 1304 and the distance from the predetermined point to the lower position 1304.

The shape detector 1202 accordingly obtains data regarding the coordinates of the upper position 1303, the distance of the upper position 1303, the coordinates of the lower position 1304, and the distance of the lower position 1304 as positional information. The coordinates of the upper position 1303 include coordinates (at least a Y axis component) at the highest position of the object in the vertical direction (Y axis direction). The coordinates of the lower position 1304 include coordinates (at least a Y axis component) at the lowest position of the object in the vertical direction (Y axis direction). For a rectangular object, the coordinates of the top surface of rectangle 1301 may be the coordinates of the upper position 1303, and the bottom surface of rectangle 1301 may be the coordinates of the lower position 1304

Figure 14B:
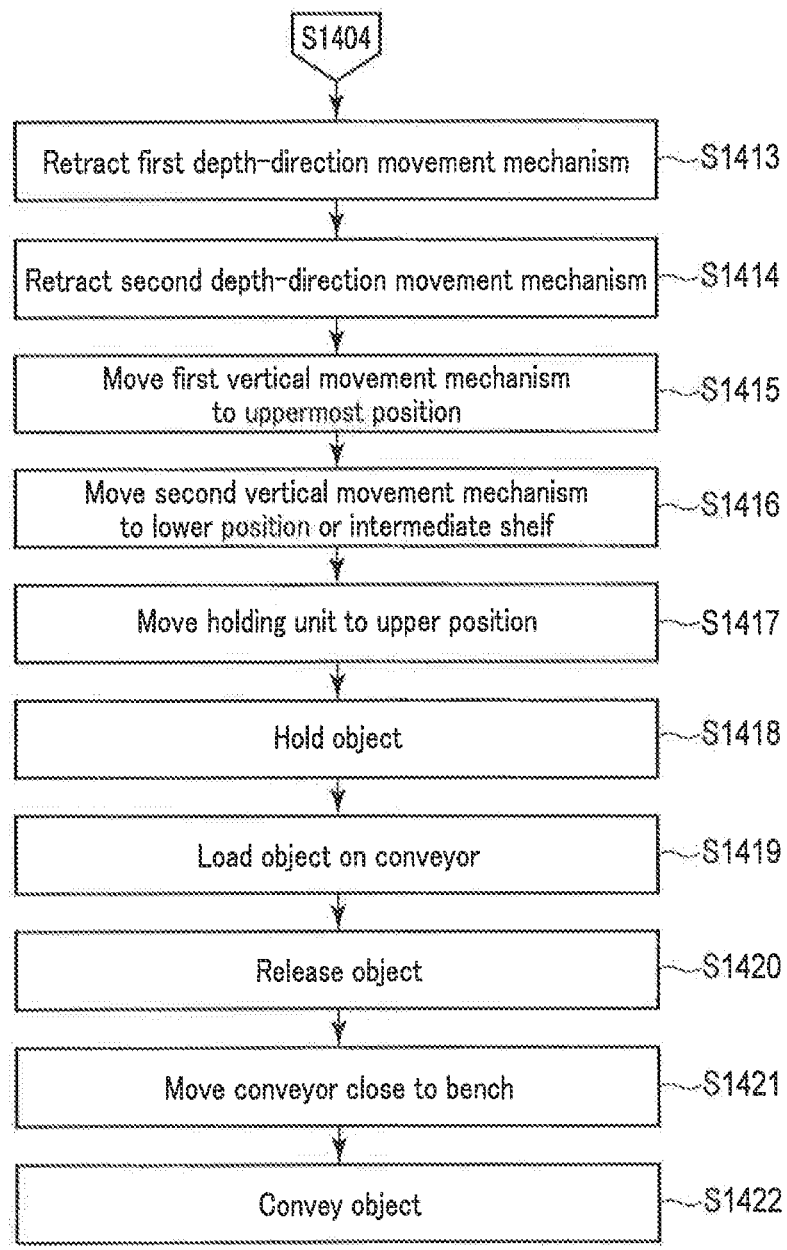
FIG. 14B is a flowchart showing an operation of a cargo handling apparatus according to the second embodiment.

The pick-up process of the cargo handling apparatus 1200 according to the second embodiment will be explained with reference to the flowcharts of FIGS. 14A to 14B.

In step S1401, the image sensor 1201 captures an image inside of the loading box and obtains image data.

In step S1402, the shape detector 1202 performs image recognition of the image data to detect the shape and determine an object.

In step S1403, the shape detector 1202 computes the upper position and the lower position of the object for which the shape is recognized. The second embodiment assumes the case where a box is an object to be picked up. The upper position and the lower position are computed for the object placed at the highest position in the vertical direction and at the foremost position in the depth direction.

In step S1404, the controller 1203 determines whether the object is placed at a position higher than the intermediate shelf. This determination may be made by comparing the upper position and the lower position computed in the step S1403 with a predetermined position of the intermediate shelf. The determination may also be made by analyzing the position of the intermediate shelf from the image data if possible.

In such a case, the shape detector 1202 or the controller 1203 may determine whether or not the object is placed higher than the intermediate shelf based on the image data. If the object is placed higher than the intermediate shelf, step S1413 is executed, and if the object is placed lower than the intermediate shelf, step S1405 is executed.

In step S1405, the first vertical movement mechanism 111, the horizontal movement mechanism 112, the first depth-direction movement mechanism 113, and the holding unit moving mechanism 114 move the holding unit 115 to the upper position of the object in response to the driving signal received from the controller 1203 indicating the driving amount for moving to the upper position.

In step S1406, the second vertical movement mechanism 116, and the second depth-direction movement mechanism 117 move the conveyor 118 to the lower position of the object in response to the driving signal received from the controller 1203 indicating the driving amount for moving to the lower position.

In step S1407, the holding unit 115 holds the object in response to the holding control signal received from the controller 1203 indicating the initiation of suction.

In step S1408, the horizontal movement mechanism 112, the first depth-direction movement mechanism 113, the holding unit moving mechanism 114, the holding unit 115, and the conveyor 118 cooperatively work in response to the driving signals, holding control signals, and convey control signals so that the object is moved to a predetermined position of the conveyor 118 and loaded on the conveyor 118.

In step S1409, after the object is loaded at the predetermined position of the conveyor 118, the holding unit 115 releases the object in response to the holding control signal received from the controller 1203 indicating the stoppage of suction.

In step S1410, the first vertical movement mechanism 111 retracts in response to a driving signal from the controller 1203 so as to not interfere with movement of the object.

In step S1411, the second vertical movement mechanism 116 and the second depth-direction movement mechanism 117 move the conveyor 118 to a position where the object can be carried to the bench in response to a driving signal received from the controller 1203.

In step S1412, the conveyor 118 conveys the object to the bench in response to a convey control signal received from the controller 1203. The object is carried to the bench by rotating the conveyor. This maintains stability of the object.

In step S1413, the first depth-direction movement mechanism 113 retracts in response to a driving signal from the controller 1203.

In step S1414, the second depth-direction movement mechanism 117 retracts in response to a driving signal from the controller 1203.

In step S1415, the first vertical movement mechanism 111 moves to the uppermost position of the base in response to a driving signal from the controller 1203.

In step S1416, the second vertical movement mechanism 116 moves the conveyor 118 to the lower position of the object placed on the intermediate shelf, or to the edge of the intermediate shelf if only one object is placed on the intermediate shelf, in response to a driving signal from the controller 1203.

In step S1417, the first vertical movement mechanism 111, the horizontal movement mechanism 112, the first depth-direction movement mechanism 113 and the holding unit moving mechanism 114 move the holding unit 115 to the upper position of the object in response to the driving signal received from the controller 1203 indicating the driving amount for moving to the upper position.

In step S1418, the holding unit 115 holds the object in response to the holding control signal received from the controller 1203 indicating the initiating of suction.

In step S1419, the horizontal movement mechanism 112, the first depth-direction movement mechanism 113, the holding unit moving mechanism 114, the holding unit 115, and the conveyor 118 cooperatively work in response to the driving signals, holding control signals, and convey control signals so that the object is moved to a predetermined position of the conveyor 118 and loaded on the conveyor 118.

In step S1420, after the object is loaded at the predetermined position of the conveyor 118, the holding unit 115 releases the object in response to the holding control signal received from the controller 1203 indicating the stoppage of suction.

In step S1421, the second vertical movement mechanism 116 and the second depth-direction movement mechanism 117 move the conveyor 118 to a position where the object can be carried to the bench in response to a driving signal received from the controller 1203.

In step S1422, the conveyor 118 carries the object to the bench in response to a convey control signal received from the controller 1203. The cargo handling processing of the cargo handling apparatus 1200 is completed by the above operation.

If the loading box becomes empty during the cargo handling processing according to the present embodiment, another loading box in which objects are loaded is replaced with the empty box, and the same processing may be repeated. The empty loading box may be replaced with the next loading box manually or by using a means for pushing the empty box out of the base and taking the next loading box into the base.

For example, for the case where the image sensor is not used, after a predetermined number of cargo handling processes are completed, the loading box is assumed to be empty, and a box driving unit (not shown in the drawings) pushes the loading box out and takes the next loading box in. For the case where the image sensor is used, the controller determines whether an oblect remains in the loading box based on the image data, and if the controller determines that there is no object, the box driving unit pushes the loading box out and takes the next loading box in.

According to the second embodiment, objects are detected based on the image data obtained by the image sensor, and the cargo handling processing is not limited to predetermined objects or predetermined arrangements, but can be applied to any arrangements of objects, thus improving versatility of the cargo handling apparatus.

The aforementioned embodiments assume the case where the base stands upright in the vertical direction (Y axis direction), and the first vertical movement mechanism 111 and the second vertical movement mechanism 116 move in the vertical direction. However, the second embodiment may be applied to the case where the base is tilted due to the shape of the base. In such a case, the first vertical movement mechanism 111 (first movement mechanism) and the second vertical movement mechanism 116 (third movement mechanism) may move along the direction of the tilt (first direction). The horizontal movement mechanism 112 and the first depth-direction movement mechanism 113 (second movement mechanism) may move on the XZ plane crossing the first direction (first approximately horizontal plane). The second depth-direction movement mechanism 117 (fourth movement mechanism) connected to the third movement mechanism may move on the XZ plane (second approximately horizontal plane) facing the first approximately horizontal plane). The first and second approximately horizontal planes are not limited to be exactly parallel to each other, but may be inclined toward the first direction or the vertical direction.

In the aforementioned embodiments, the holding unit 115 and the conveyor 118 are moved upon the movement of each movement mechanism, but the holding unit 115 and the conveyor 118 may be movable independently from the movement mechanisms. For example, the cargo handling apparatus may include the holding unit 115, which is attached to the end of an arm movable in the same range as the first and second movement mechanisms and in three axial directions, and the conveyor 118 movable in the same range as the third and fourth movement mechanisms. Such a cargo handling apparatus realizes downsizing of the apparatus while establishing the same stability in carrying objects as the apparatus according to the first and second embodiments.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A cargo handling apparatus, comprising:
   a first movement mechanism that is movable in a first direction;
   a second movement mechanism that is connected to the first movement mechanism and is movable on a first horizontal plane intersecting the first direction;
   a holding unit that is connected to the second movement mechanism and holds an object to be picked up;
   a third movement mechanism that is arranged below the first movement mechanism, the second movement mechanism and the holding unit, and is movable in the first direction;
   a fourth movement mechanism that is connected to the third movement mechanism and is movable on a second horizontal plane opposed to the first horizontal plane; and
   a conveyor that is connected to the fourth movement mechanism, and loads and conveys the object, wherein
   the apparatus has a region to include a loading box for loading the object.

2. The apparatus according to claim 1, further comprising:
   an image sensor that captures image data of the object;
   a detector that detects an upper position and a lower position of the object from the image data; and
   a controller that drives the first movement mechanism and the second movement mechanism to allow the holding unit to move toward the upper position, and drives the third movement mechanism and the fourth movement mechanism to allow the conveyor to move toward the lower position.

3. The apparatus according to claim 2, wherein
   the image sensor obtains positional information including information regarding the distance from the object, and
   the controller computes a first distance between the second movement mechanism and the upper position and a second distance between the fourth movement mechanism and the lower position based on the positional information, drives the first movement mechanism and the second movement mechanism based on the first distance, and drives the third movement mechanism and the fourth movement mechanism based on the second distance.

4. The apparatus according to claim 1, wherein the first movement mechanism, the second movement mechanism, and the holding unit move so as to not strike the conveyor and the object when the conveyor conveys the object.

5. The apparatus according to claim 2, wherein when the object is loaded on an intermediate shelf, the third movement mechanism and the fourth movement mechanism move so that one end of the conveyor is placed at the lower position of the object, or that one end of the conveyor is positioned at a lower end of the intermediate shelf close to the conveyor.

6. A cargo handling apparatus, comprising:
 a base that is a supporting body;
 a holding unit that is connected inside the base and is movable in a first direction, a second direction and a third direction, and holds an object, the second direction being orthogonal to the first direction, the third direction orthogonal to the first direction and the second direction; and
 a conveyor that is connected inside the base at a lower position than the holding unit and movable to the first and second directions, and conveys the object held by the holding unit,
 wherein the conveyor moves close to a lower portion of the object and loads the object onto the conveyor by cooperating with the holding unit, and the base has a region to include a loading box for loading the object.

7. A cargo handling method for a cargo handling apparatus, comprising:
 obtaining image data of an object to be picked up;
 detecting a shape of the object from the image data, and detecting an upper position and a lower position of the object;
 driving a holding unit to move toward the upper position, the holding unit holding the object;
 driving a conveyor to move toward the lower position, the conveyor loading and conveying the object;
 holding by the holding unit the object detected at the upper position;
 loading the object onto the conveyor by cooperative work between the holding unit and the conveyor;
 moving the holding unit so as to not strike the object when the conveyor conveys the object; and
 moving the conveyor close to a bench that is a destination of the object, and conveys the object to the bench, the apparatus has a region to include a loading box for loading the object.

* * * * *